United States Patent
Chiu et al.

(10) Patent No.: US 10,298,951 B2
(45) Date of Patent: May 21, 2019

(54) METHOD AND APPARATUS OF MOTION VECTOR PREDICTION

(71) Applicant: MEDIATEK INC., Hsin-Chu (TW)

(72) Inventors: Min-Hao Chiu, Hsinchu (TW);
Chia-yun Cheng, Hsinchu (TW);
Yung-Chang Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/832,959

(22) Filed: Dec. 6, 2017

(65) Prior Publication Data
US 2018/0295380 A1   Oct. 11, 2018

Related U.S. Application Data

(60) Provisional application No. 62/482,233, filed on Apr. 6, 2017.

(51) Int. Cl.
*H04N 19/513* (2014.01)
*H04N 19/55* (2014.01)
*H04N 19/52* (2014.01)
*H04N 19/573* (2014.01)

(52) U.S. Cl.
CPC .......... *H04N 19/521* (2014.11); *H04N 19/52* (2014.11); *H04N 19/55* (2014.11); *H04N 19/573* (2014.11)

(58) Field of Classification Search
CPC ...... H04N 19/521; H04N 19/52; H04N 19/55; H04N 19/573

USPC ..................................................... 375/240.16
See application file for complete search history.

(56) References Cited

FOREIGN PATENT DOCUMENTS

| CN | 1523896 A | 8/2004 |
|---|---|---|
| CN | 1885948 A | 12/2006 |
| CN | 103841425 A | 6/2014 |
| CN | 104272743 A | 1/2015 |

OTHER PUBLICATIONS

"Information Technology—High Efficiency Media Coding—Part 2 Video;" Apr. 2016; pp. 1-196.
Partial translation of "Information Technology—High Efficiency Media Coding—Part 2 Video."

*Primary Examiner* — Nguyen T Truong
(74) *Attorney, Agent, or Firm* — McClure, Qualey & Rodack, LLP

(57) ABSTRACT

A method and apparatus for video encoding or decoding used by an AVS2 (Second Generation of Audio Video Coding Standard) video encoder or decoder respectively are disclosed. According to this method, first motion vectors associated with spatial neighboring blocks of a current block are determined. For each spatial neighboring block, a value of 1 is assigned to a first BlockDistance associated with the spatial neighboring block if a corresponding first reference picture is a G picture or GB picture. Motion vector predictor candidates are derived from the first motion vectors by scaling each first motion vector according to a corresponding first BlockDistance and a current BlockDistance. A final motion vector predictor is determined among the motion vector predictor candidates. The current motion vector is encoded or decoded using the final motion vector predictor

6 Claims, 2 Drawing Sheets

METHOD AND APPARATUS OF MOTION VECTOR PREDICTION

CROSS REFERENCE TO RELATED APPLICATIONS

The present invention claims priority to U.S. Provisional Patent Application, Ser. No. 62/482,233, filed Apr. 6, 2017. The U.S. Provisional Patent Application is hereby incorporated by reference in its entirety.

FIELD OF THE INVENTION

The present invention relates to video coding techniques. In particular, the present invention relates to method and apparatus of motion vector prediction (MVP) for the case that a motion vector of a neighboring block points to reference picture corresponding to a G picture or GB picture in the AVS2 standard (High efficiency coding of audio and video-Part 1: Video, GY/T 299.1-2016, Second Generation of Audio Video Coding Standard, by Audio and Video coding standard workgroup of China).

BACKGROUND

Motion estimation is an effective Inter-frame coding technique to exploit temporal redundancy in video sequences. Motion-compensated Inter-frame coding has been widely used in various video coding standards, such as H.264, HEVC (High Efficiency Video Coding) and AVS2. The motion estimation adopted in various coding standards is often a block-based technique, where motion information such as coding mode and motion vector is determined for each macroblock, coding unit or similar block configuration. In addition, Intra-coding is also adaptively applied, where the picture is processed without reference to any other picture. The Inter-predicted or Intra-predicted residues are usually further processed by transformation, quantization, and entropy coding to generate a compressed video bitstream. For Inter prediction, one or more previous coded pictures are used to derive Inter prediction for the current picture. The previous coded pictures are referred as reference pictures and are stored in Decoded Picture Buffer (DPB).

For AVS2, various picture types, including I/P/B/F/G/GB and S pictures, have been used. The use of I, P and B pictures is similar to that for H.264 and HEVC, where I refers to an Intra coded picture, P refers to a forward predicted picture based on one reference picture and B refers to a bi-direction predicted picture using one picture before and one picture after the current picture in the display order. In AVS2, F refers to a forward predicted picture based on one or two reference pictures. G and GB refer to an Intra predicted scene picture, where the G picture will be outputted and the GB picture will not be outputted. S refers to the Intra prediction picture or a forward predicted picture based on one reference picture. Furthermore, an S picture only uses a most recently decoded G or GB as the reference picture.

AVS2 also uses block-based coding, where an image, a slice is partitioned into blocks and coding process is applied to each block. Furthermore, the block partition process often starts with a largest coding unit (LCU) and the LCU is partitioned into one or more coding units (CUs) using quadtree partition or binary-tree partition. Other similar image units such as super block (SB) or coding tree block (CTB) are also used. In the sequence header for AVS2, a syntax element indicating the LCU size is included. For AVS2, a syntax element, progressive_sequence is included to indicate whether the images associated with this sequence header are progressive or not. Progressive_sequence equal to 1 represents all pictures in the sequence are frame picture and progressive sequence equal to 0 represents all pictures in the sequence are frame picture or field picture. Similarly, syntax element field_coded_sequence is included in the sequence header, where field_coded_sequence equal to 1 represents all pictures in the sequence are field picture and field_coded_sequence equal to 0 represents all pictures in the sequence are frame picture. If progressive sequence is equal to 1, field_coded_sequence should be 0. Also, syntax element, bitdepth is included in the sequence header to indicate the bit depth of the pixel data of images associated with the sequence header. Furthermore, syntax element chroma_format is included in the sequence header to indicate the chroma format being used for images associated with the sequence header. For example, the chroma format may correspond to 4:0:0, 4:2:0, 4:2:2 or 4:4:4 format.

For Inter prediction modes, the temporal reconstructed reference frames can be used to generate motion compensated predictions. Motion vector (MV) associated with a current PU needs to be signaled so that a reference block can be located. In order to improve coding efficiency of MV coding, the MV is coded predictively using a Motion Vector Predictor (MVP). Therefore, when a PU is coded in using MVP, the motion vector difference (MVD) between a current MV and an MVP is derived and signaled in the video bitstream. At the decoder side, the MV is reconstructed according to: MV=MVP+MVD.

The MVP is determined by the encoder from an MVP candidate list generated from previous coded spatial and temporal neighboring blocks. The decoder maintains a same copy of the MVP candidate list. Furthermore, the encoder selects an MVP as a predictor for a current MV based on characteristics of neighboring PUs and the same selection process is performed at the decoder side. Therefore, there is no need to signal the MVP selection information (e.g. MVP index). When the MVP is used to predict the MV of a current PU, the MV of the current CU may be the same as that of the MVP. In this case, the MVD is zero and there is no need to transmit the MVD. The motion information of the current PU can inherit the motion information of the MVP. Therefore, the motion information (e.g. motion vector, prediction direction and reference picture number) for the current MV can be inherited from the motion information of the MVP. The MVP can be determined at the decoder side without the need of an MVP index, which makes the MVP a very efficient coding tool for the MV coding.

The residues for a current PU are derived as the differences between the current PU and a reference block at the encoder side. The residues can be signaled by the encoder. When the MV is the same as the MVP, only the residues are signaled without the need to signal MVD. This coding mode is referred as a "Direct" mode since the motion information of the MVP can be used directly as the reconstruct the current MV. Furthermore, the differences between the current PU and the reference PU can be very small or zero (i.e., the reference PU being close or the same as the current PU). In this case, there is no need to signal the residues and the case is referred as "Skip" mode. In other words, a Skip-mode coded block can be reconstructed using the derived MVP information at the decoder side without the need for signaling any residue or the MVD.

According to AVS2, a MVP candidate set is derived for non-Direct/Direct CUs and non-Skip/Skip mode CUs. For non-Direct and non-Skip mode CUs, the MVP candidates are derived from MVs of spatial neighboring blocks at L (141), U (130), UR (132) and UL (140) as shown in FIG. 1, where block 112 in the current picture 110 corresponds to the current PU. The MVP candidate set for Direct CUs and Skip CUs are derived from MVs of spatial neighboring blocks at L (141), U (130), UR (132), UL (140), L1 (142) and U1 (131) as shown in FIG. 1. Furthermore, the MVP candidate set for Direct CUs and Skip CUs also include a temporal MVP candidate from the MV of a top-left block Col-T (150) in a collocated PU 122 in reference picture 120.

The derivation process of MVP for non-Direct CUs and non-Skip CUs is described as follows. The MVP derivation is based on the MVs associated with the four spatial neighboring blocks (i.e., L (141), U (130), UR (132) and UL (140) in FIG. 1). The MVs at L (141), U (130), UR (132) and UL (140) are referred as MVA, MVB, MVC and MVD respectively. The block distance (referred as BlockDistance) between a current block in a current picture and the reference block in a reference picture pointed by the MV of the current block is derived for the current block and all candidate blocks (i.e., blocks L, U, UL and UR). As mentioned above, in AVS2, a syntax element, field_coded_sequence is used to indicate whether the current sequence is a field_coded_sequence. If field_coded_sequence has a value of 1, the current sequence is a field_coded_sequence; otherwise, the current sequence is not. Two variables, delta1 and delta2 are used in the MVP derivation, where the values of delta1 and delta2 are determined from field_coded_sequence. If field_coded_sequence has a value of 0, both delta1 and delta2 are zero. Otherwise, delta1 and delta2 may have values belonging to {−2, 0, 2} depending on whether mvX (X corresponding to A, B or C) is associated with a block in a top field or a bottom field and whether mvX points to a top field or a bottom field.

The MVs of neighboring blocks have to be scaled properly according to the block distances of the current block (i.e., BlockDistanceE) and the block distance of a neighboring block (i.e., BlockDistanceX):

$$MVA\_x = \text{Clip3}(-32768, 32767, \text{Sign}(mvA\_x) \times ((\text{Abs}(mvA\_x) \times \text{BlockDistanceE} \times (16384/\text{BlockDistanceA}) \times 8192) >> 14))$$

$$MVA\_y = \text{Clip3}(-32768, 32767, \text{Sign}(mvA\_y + \text{delta1}) \times ((\text{Abs}(mvA\_y + \text{delta1}) \times \text{BlockDistanceE} \times (16384/\text{BlockDistanceA}) + 8192) >> 14) - \text{delta2})$$

$$MVB\_x = \text{Clip3}(-32768, 32767, \text{Sign}(mvB\_x) \times ((\text{Abs}(mvB\_x) \times \text{BlockDistanceE} \times (16384/\text{BlockDistanceB}) \times 8192) >> 14))$$

$$MVB\_y = \text{Clip3}(-32768, 32767, \text{Sign}(mvB\_y + \text{delta1}) \times ((\text{Abs}(mvB\_y + \text{delta1}) \times \text{BlockDistanceE} \times (16384/\text{BlockDistanceB}) + 8192) >> 14) - \text{delta2})$$

$$MVC\_x = \text{Clip3}(-32768, 32767, \text{Sign}(mvC\_x) \times ((\text{Abs}(mvC\_x) \times \text{BlockDistanceE} \times (16384/\text{BlockDistanceB}) \times 8192) >> 14))$$

$$MVC\_y = \text{Clip3}(-32768, 32767, \text{Sign}(mvC\_y + \text{delta1}) \times ((\text{Abs}(mvC\_y + \text{delta1}) \times \text{BlockDistanceE} \times (16384/\text{BlockDistanceC}) + 8192) >> 14) - \text{delta2})$$

In the above equation, Clips(i,j,x) is a clipping function that clips variable x to the range between I and j; Abs(x) is an absolute value function; and Sign(x) is a sign function to output 1 for non-negative x and output −1 for negative x. As shown above, the block distance plays an important role in MVP scaling. The block distance is derived as follows:

If reference picture is before the current picture:
BlockDistance=[(DistanceIndexCur−DistanceIndexRef)+512]% 512
DistanceIndexCur is the DistanceIndex of current picture, and
DistanceIndexRef is the DistanceIndex of reference picture.

If reference picture is after the current picture:
BlockDistance=[(DistanceIndexRef−DistanceIndexCur)+512]% 512

DistanceIndex is derived from syntax of bitstream as follows:
If field_coded_sequence=0, DistanceIndex=POI×2+1,
If field_coded_sequence=1, DistanceIndex=POI×2, and
POI (picture order index) is picture order index and derived from syntax of bitstream.

When the reference picture of a neighboring block is G or GB picture, the BlockDistance of neighbor block is not defined in the AVS2 if the current block also points to a G or GB reference picture. The neighbor blocks include L (141), U (130), UR (132) and UL (140) as shown in FIG. 2. According to AVS2, if the SceneReferenceEnableFlag is equal to 1 for the current picture (i.e., the current picture being allowed to use G or GB reference picture), and only one of the current MV and the mvX points to the reference picture located at (RefPicNum−1) of the reference picture buffer (i.e., the location for storing a G or GB picture), then BlockDistanceX is defined as 1.

When the BlockDistanceX is undefined, it may cause a serious issue in the coding process. As mentioned above, the BlockDistanceX is used to scale the MVP to take into account the difference in block distance associated with the MV of a neighboring block and the block distance of the current MV. In order to overcome the undefined BlockDistanceX issue, the present invention discloses a process to ensure the BlockDistanceX associated with the MV of a neighboring block pointing to a G or GB picture is properly defined.

BRIEF SUMMARY OF THE INVENTION

A method and apparatus for video encoding or decoding used by an AVS2 (Second Generation of Audio Video Coding Standard) video encoder or decoder respectively are disclosed. According to this method, first motion vectors associated with spatial neighboring blocks of a current block are determined, where each first motion vector points from one spatial neighboring block of the current block to one first reference block in one first reference picture. For each spatial neighboring block, a value of 1 is assigned to a first BlockDistance associated with the spatial neighboring block if a corresponding first reference picture is a G picture or GB picture, where the first BlockDistance corresponds to a temporal distance between the spatial neighboring block of the current block and a corresponding reference block pointed by a corresponding first motion vector of the spatial neighboring block of the current block. Motion vector predictor candidates are derived from the first motion vectors by scaling each first motion vector according to a corresponding first BlockDistance and a current BlockDistance, where the current BlockDistance corresponds to current a temporal distance between the current block and a current reference block pointed by a current motion vector of the current block. A final motion vector predictor is determined among the motion vector predictor candidates. The current motion vector is encoded or decoded using the final motion vector predictor. The spatial neighboring blocks of the current block may consist of four neighboring blocks corresponding to a Left (L) block, an Upper (U) block, an Upper-Right (UR) block and an Upper-Left (UL) block.

Aspects of the disclosure further provide a non-transitory computer readable medium storing program instructions causing a processing circuit of an apparatus to perform the video coding method mentioned above.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
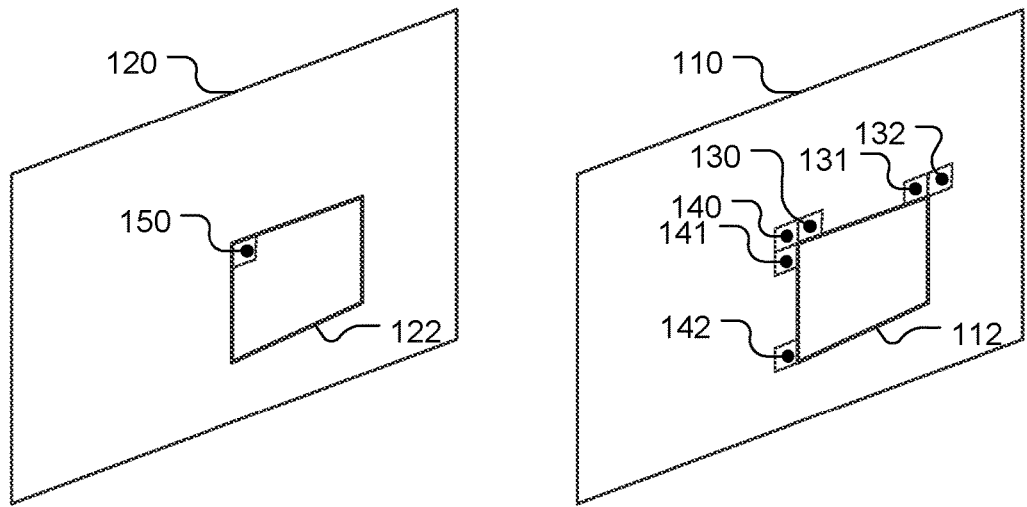
FIG. 1 illustrates the spatial neighboring blocks and a temporal collocated block of the current block that are used to derive Direct mode and Skip mode motion vector prediction (MVP) candidate list according to AVS2 (Second Generation of Audio Video Coding Standard).
Figure 2:
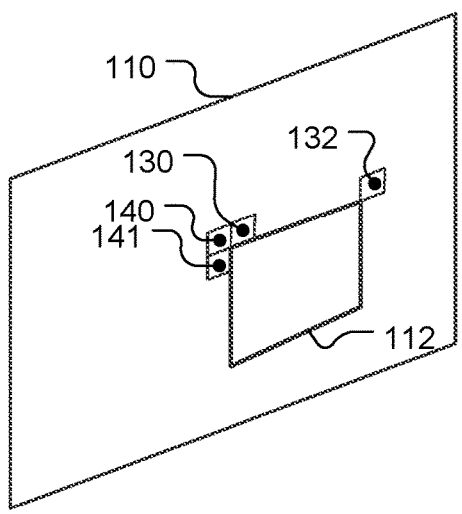
FIG. 2 illustrates the spatial neighboring blocks of the current block that are used to derive non-Direct and non-Skip mode motion vector prediction (MVP) candidate list according to AVS2 (Second Generation of Audio Video Coding Standard).

As mentioned above, when the reference picture of a neighboring block is G or GB picture, the BlockDistance of neighbor block is not defined in the AVS2 if the current block also points to a G or GB reference picture. The neighbor blocks include L (141), U (130), UR (132) and UL (140) as shown in FIG. 2. The parameter BlockDistance is used for scaling of MVP. If the BlockDistance is not properly defined, it may affect the correctness of MVP scaling. Consequently, the coding efficiency may be degraded.

In order to overcome this issue, an embodiment of the present invention detects whether the reference picture of a neighboring block is G or GB picture. If the reference picture of neighboring block is G or GB picture, the BlockDistance associated with the motion vector of the neighboring block is assign to 1. Therefore, the BlockDistance of neighboring block will be always defined.

Figure 3:
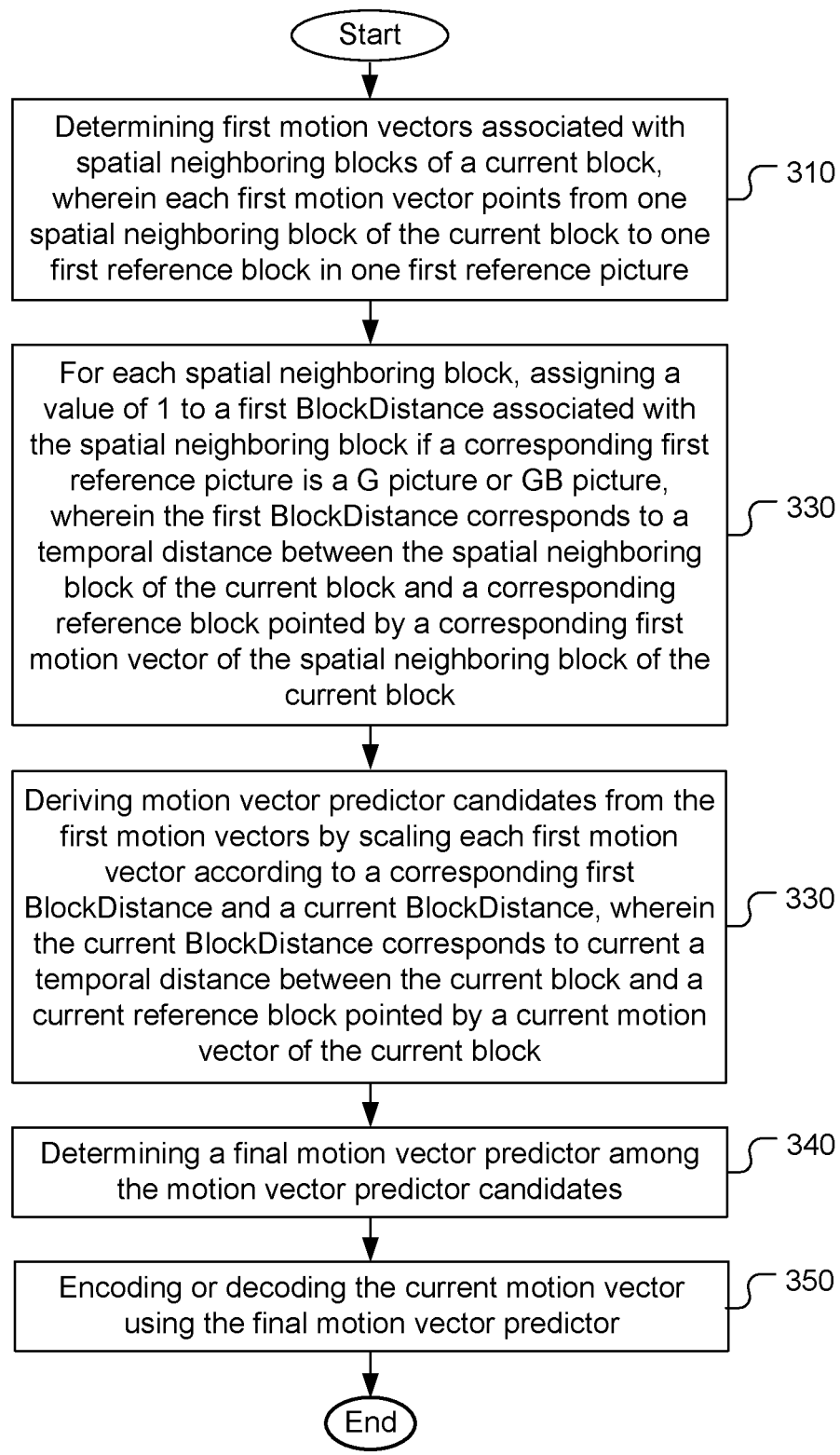
FIG. 3 illustrates the flowchart of an exemplary video coding system incorporating motion vector prediction according to an embodiment of the present invention.

FIG. 3 illustrates the flowchart of an exemplary video coding system incorporating motion vector prediction according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, first motion vectors associated with spatial neighboring blocks of a current block are determined as shown in step 310, where each first motion vector points from one spatial neighboring block of the current block to one first reference block in one first reference picture. As mentioned before, spatial neighboring blocks of the current block include L (141), U (130), UR (132) and UL (140) as shown in FIG. 2. At the encoder side, these neighboring blocks have been encoded and the MVs (referred as first motion vectors) are known. At the decoder side, the MVs of these neighboring blocks have been decoded and known. The motion vectors of these spatial neighboring blocks are used to derive MVP candidate list. For each spatial neighboring block, a value of 1 is assigned to a first BlockDistance associated with the spatial neighboring block if a corresponding first reference picture is a G picture or GB picture as shown in step 320, where the first BlockDistance corresponds to a temporal distance between the spatial neighboring block of the current block and a corresponding reference block pointed by a corresponding first motion vector of the spatial neighboring block of the current block. The MVP candidate list derivation is performed at the encoder side as well as the decoder side. As mentioned above, the BlockDistance is not defined for this case according to AVS2. Motion vector predictor candidates are derived from the first motion vectors by scaling each first motion vector according to a corresponding first BlockDistance and a current BlockDistance in step 330, where the current BlockDistance corresponds to current a temporal distance between the current block and a current reference block pointed by a current motion vector of the current block. As mentioned before, the motion vector of a neighboring block may point to a reference picture different from the target reference picture of the current block. Therefore, the MVP needs to be scaled using the BlockDistance. A final motion vector predictor is determined among the motion vector predictor candidates in step 340. In the encoder side, the final motion vector predictor may be determined by selecting one MVP candidate that achieves the best coding performance. As is known in the art, the encoder may use rate-distortion optimization (RDO) process to select the best MVP candidate. The final MVP is signaled to the decoder so that the decoder can determine the final MVP from the MVP candidate list according to the MVP index. The current motion vector is encoded or decoded using the final motion vector predictor in step 350.

The flowchart shown above is intended to illustrate examples of video encoding or decoding process according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

Embodiment of the present invention as described above may be implemented in a video encoder and a video decoder. The components of the video encoder and video decoder may be implemented by hardware components, one or more processors configured to execute program instructions stored in a memory, or a combination of hardware and processor. For example, a processor executes program instructions to control receiving of input data associated with a video sequence including a current block in a current picture. The processor is equipped with a single or multiple processing cores. In some examples, the processor executes program instructions to perform functions in some components in the encoder and the decoder, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding or decoding used by an AVS2 (Second Generation of Audio Video Coding Standard) video encoder or decoder respectively, the method comprising:

determining whether a current reference picture pointed by a current motion vector of a current block is one G picture or GB picture;

determining first motion vectors associated with spatial neighboring blocks of the current block, wherein each first motion vector points from one spatial neighboring block of the current block to one first reference block in one first reference picture;

for each spatial neighboring block, assigning a value of 1 to a first BlockDistance associated with the spatial neighboring block if the current reference picture and a corresponding first reference picture both are a G picture or GB picture, wherein the first BlockDistance corresponds to a temporal distance between the spatial neighboring block of the current block and a corresponding reference block pointed by a corresponding first motion vector of the spatial neighboring block of the current block;

deriving motion vector predictor candidates from the first motion vectors by scaling each first motion vector according to a corresponding first BlockDistance and a current BlockDistance, wherein the current BlockDistance corresponds to current a temporal distance between the current block and a current reference block pointed by a current motion vector of the current block;

determining a final motion vector predictor among the motion vector predictor candidates; and encoding or decoding the current motion vector using the final motion vector predictor.

2. The method of video encoding or decoding in claim 1, wherein the spatial neighboring blocks of the current block consist of four neighboring blocks corresponding to a Left (L) block, an Upper (U) block, an Upper-Right (UR) block and an Upper-Left (UL) block.

3. An apparatus of video encoding or decoding used by an AVS2 (Second Generation of Audio Video Coding Standard) video encoder or decoder respectively, the apparatus comprising one or more electronic circuits or processors arrange to:

determine whether a current reference picture pointed by a current motion vector of a current block is one G picture or GB picture;

determine first motion vectors associated with spatial neighboring blocks of a current block, wherein each first motion vector points from one spatial neighboring block of the current block to one first reference block in one first reference picture;

for each spatial neighboring block, assign a value of 1 to a first BlockDistance associated with the spatial neighboring block if a corresponding first reference picture both are a G picture or GB picture, wherein the first BlockDistance corresponds to a temporal distance between the spatial neighboring block of the current block and a corresponding reference block pointed by a corresponding first motion vector of the spatial neighboring block of the current block;

derive motion vector predictor candidates from the first motion vectors by scaling each first motion vector according to a corresponding first BlockDistance and a current BlockDistance, wherein the current BlockDistance corresponds to current a temporal distance between the current block and a current reference block pointed by a current motion vector of the current block;

determine a final motion vector predictor among the motion vector predictor candidates; and encode or decode the current motion vector using the final motion vector predictor.

4. The apparatus of video encoding or decoding in claim 3, wherein the spatial neighboring blocks of the current block consist of four neighboring blocks corresponding to a Left (L) block, an Upper (U) block, an Upper-Right (UR) block and an Upper-Left (UL) block.

5. A non-transitory computer readable medium storing program instructions causing a processing circuit of an apparatus to perform a video coding method, and the method comprising:

determining whether a current reference picture pointed by a current motion vector of a current block is one G picture or GB picture;

determining first motion vectors associated with spatial neighboring blocks of a current block, wherein each first motion vector points from one spatial neighboring block of the current block to one first reference block in one first reference picture;

for each spatial neighboring block, assigning a value of 1 to a first BlockDistance associated with the spatial neighboring block if a corresponding first reference picture both are a G picture or GB picture, wherein the first BlockDistance corresponds to a temporal distance between the spatial neighboring block of the current block and a corresponding reference block pointed by a corresponding first motion vector of the spatial neighboring block of the current block;

deriving motion vector predictor candidates from the first motion vectors by scaling each first motion vector according to a corresponding first BlockDistance and a current BlockDistance, wherein the current BlockDistance corresponds to current a temporal distance between the current block and a current reference block pointed by a current motion vector of the current block;

determining a final motion vector predictor among the motion vector predictor candidates; and encoding or decoding the current motion vector using the final motion vector predictor.

6. The method in claim 5, wherein the spatial neighboring blocks of the current block consist of four neighboring blocks corresponding to a Left (L) block, an Upper (U) block, an Upper-Right (UR) block and an Upper-Left (UL) block.

* * * * *